(12) United States Patent
Shuey

(10) Patent No.: US 11,852,275 B2
(45) Date of Patent: Dec. 26, 2023

(54) TAPE FOR INSULATION JACKETING AND METHOD OF FORMING SECURABLE INSULATION JACKET

(71) Applicant: Avery Dennison Corporation, Glendale, CA (US)

(72) Inventor: David J. Shuey, Cleveland, OH (US)

(73) Assignee: Avery Dennison Corporation, Glendale, CA (US)

( * ) Notice: Subject to any disclaimer, the term of this patent is extended or adjusted under 35 U.S.C. 154(b) by 44 days.

(21) Appl. No.: 17/343,520

(22) Filed: Jun. 9, 2021

(65) Prior Publication Data

US 2021/0293369 A1 Sep. 23, 2021

Related U.S. Application Data

(62) Division of application No. 15/152,728, filed on May 12, 2016, now Pat. No. 11,060,654.

(Continued)

(51) Int. Cl.
*F16L 59/02* (2006.01)
*C09J 7/38* (2018.01)
(Continued)

(52) U.S. Cl.
CPC ............ *F16L 59/028* (2013.01); *B29C 65/48* (2013.01); *B32B 3/266* (2013.01); *B32B 5/02* (2013.01); *B32B 5/18* (2013.01); *B32B 7/06* (2013.01); *B32B 7/12* (2013.01); *B32B 19/04* (2013.01); *B32B 27/06* (2013.01); *B32B 27/065* (2013.01); *B32B 27/12* (2013.01); *B32B 27/32* (2013.01);
(Continued)

(58) Field of Classification Search
CPC .. B32B 7/06; B32B 7/12; B32B 19/04; B32B 27/06; B32B 27/065; B32B 27/12; B32B 27/32; B32B 29/002; B32B 29/007; B32B 29/02; B32B 37/12; B32B 37/1292; B32B 37/30; B32B 38/10; B32B 37/0076; F16L 59/002; F16L 59/029; F16L 59/04; F16L 59/08; F16L 59/14; F24F 13/0263
See application file for complete search history.

(56) References Cited

U.S. PATENT DOCUMENTS 1,797,443 A * 3/1931 Powell ................... F16L 59/15
156/213
2,258,218 A 10/1941 Rochow
(Continued)

FOREIGN PATENT DOCUMENTS

| AU | 46681/72 | 3/1974 |
| DE | 102008006210 | 7/2009 |
| EP | 1588802 | 10/2005 |

OTHER PUBLICATIONS

English machine translation of NO141063B; Yoshimura; Sep. 1979; 11 pages. (Year: 1979).*

(Continued)

*Primary Examiner* — Linda L Gray

(57) ABSTRACT

A multilayer tape assembly is described which can be used with insulation jacketing and particularly for self-sealing lap (SSL) applications. The tape assembly includes two adhesive layers with associated carrier and release layers in conjunction with a differential release system. Various methods of use are also described, including a method of forming a securable insulation jacket.

22 Claims, 10 Drawing Sheets

Related U.S. Application Data

(60) Provisional application No. 62/156,373, filed on May 4, 2015.

(51) Int. Cl.

| | | |
|---|---|---|
| *B32B 27/06* | (2006.01) |
| *F16L 59/08* | (2006.01) |
| *B32B 7/06* | (2019.01) |
| *B32B 7/12* | (2006.01) |
| *F24F 13/02* | (2006.01) |
| *B32B 5/18* | (2006.01) |
| *C09J 7/20* | (2018.01) |
| *B32B 29/00* | (2006.01) |
| *B32B 19/04* | (2006.01) |
| *B32B 27/32* | (2006.01) |
| *B32B 3/26* | (2006.01) |
| *C09J 7/22* | (2018.01) |
| *C09J 7/21* | (2018.01) |
| *C09J 7/40* | (2018.01) |
| *B32B 5/02* | (2006.01) |
| *B32B 27/12* | (2006.01) |
| *B32B 29/02* | (2006.01) |
| *F16L 59/04* | (2006.01) |
| *B32B 37/30* | (2006.01) |
| *B32B 37/12* | (2006.01) |
| *B32B 38/10* | (2006.01) |
| *B29C 65/48* | (2006.01) |
| *F16L 59/14* | (2006.01) |
| *B32B 37/26* | (2006.01) |
| *B29L 31/26* | (2006.01) |

(52) U.S. Cl.
CPC .......... *B32B 29/002* (2013.01); *B32B 29/007* (2013.01); *B32B 29/02* (2013.01); *B32B 37/12* (2013.01); *B32B 37/1292* (2013.01); *B32B 37/30* (2013.01); *B32B 38/10* (2013.01); *C09J 7/201* (2018.01); *C09J 7/21* (2018.01); *C09J 7/22* (2018.01); *C09J 7/38* (2018.01); *C09J 7/40* (2018.01); *F16L 59/022* (2013.01); *F16L 59/029* (2013.01); *F16L 59/04* (2013.01); *F16L 59/08* (2013.01); *F16L 59/14* (2013.01); *F24F 13/0263* (2013.01); *B29L 2031/26* (2013.01); *B32B 2037/268* (2013.01); *B32B 2255/02* (2013.01); *B32B 2255/10* (2013.01); *B32B 2255/26* (2013.01); *B32B 2307/304* (2013.01); *B32B 2307/748* (2013.01); *B32B 2317/12* (2013.01); *B32B 2405/00* (2013.01); *B32B 2597/00* (2013.01); *C09J 2301/122* (2020.08); *C09J 2301/124* (2020.08); *C09J 2301/20* (2020.08); *C09J 2301/204* (2020.08); *C09J 2301/302* (2020.08); *C09J 2400/283* (2013.01); *C09J 2421/00* (2013.01); *C09J 2423/046* (2013.01); *C09J 2433/00* (2013.01); *C09J 2483/00* (2013.01); *C09J 2483/005* (2013.01); *Y10T 428/14* (2015.01)

(56) References Cited

U.S. PATENT DOCUMENTS

| | | |
|---|---|---|
| 2,258,220 A | 10/1941 | Rochow |
| 2,258,222 A | 10/1941 | Rochow |
| 2,448,565 A | 9/1948 | Wright et al. |
| 2,480,620 A | 8/1949 | Warrick |
| 2,494,920 A | 1/1950 | Warrick |
| 2,723,966 A | 11/1955 | Youngs |
| 2,736,721 A | 2/1956 | Mich |
| 2,814,601 A | 11/1957 | Currie et al. |
| 2,857,356 A | 10/1958 | Goodwin |
| 3,432,333 A | 3/1969 | Hurst |
| 3,518,325 A | 6/1970 | Sprenger et al. |
| 3,528,940 A | 9/1970 | Modic |
| 3,577,398 A | 5/1971 | Pace et al. |
| 3,697,549 A | 10/1972 | Siddall |
| 3,878,263 A | 4/1975 | Martin |
| 4,064,286 A | 12/1977 | Hahn |
| 4,157,410 A | 6/1979 | McClintock |
| 4,301,268 A | 11/1981 | Kropac |
| 4,306,050 A | 12/1981 | Koerner et al. |
| 4,389,270 A | 6/1983 | McClintock |
| 4,908,274 A | 3/1990 | Jachmann et al. |
| 4,963,438 A | 10/1990 | Weitemeyer et al. |
| 4,978,726 A | 12/1990 | Dohler et al. |
| 5,034,491 A | 7/1991 | Wewers et al. |
| 5,141,793 A | 8/1992 | Fontanilla |
| 5,264,532 A | 11/1993 | Bernard |
| 5,290,842 A | 3/1994 | Sasaki et al. |
| 5,601,881 A * | 2/1997 | Grimm ................ B29C 48/154 427/430.1 |
| 5,622,761 A | 4/1997 | Cole |
| 5,663,228 A | 9/1997 | Sasaki et al. |
| 6,485,825 B1 * | 11/2002 | Heguri ............... C08G 18/6254 428/354 |
| 7,165,888 B2 | 1/2007 | Rodick |
| 2004/0126575 A1 | 7/2004 | Yoshida et al. |
| 2012/0322910 A1 | 12/2012 | Chatterjee et al. |

OTHER PUBLICATIONS

English machine translation of CA1011416A, May 1977; 2 pages. (Year: 1977).*

Yoshinobu, Nakamura, et al. "Effects of compatibility of acrylic block copolymer and tackifier on phase structure and peel adhesion of their blend." Journal of Adhesion Science and Technology 22.12 (Jan. 1, 2008): 1313-331.

International Search Report and Written Opinion issued in corresponding IA No. PCT/US2016/036252 dated Nov. 9, 2016.

International Search Report and Written Opinion dated Aug. 10, 2016 issued in corresponding IA No. PCT/IB/2016/052744 filed May 12, 2016.

International Preliminary Report on Patentability dated Nov. 16, 2017 issued in corresponding IA No. PCT/IB/2016/052744 filed May 12, 2016.

* cited by examiner

TAPE FOR INSULATION JACKETING AND METHOD OF FORMING SECURABLE INSULATION JACKET

CROSS-REFERENCE TO RELATED APPLICATION

The present application is a division of U.S. patent application Ser. No. 15/152,728 filed May 12, 2016, and claims the benefit of U.S. Provisional Patent Application No. 62/156,373 filed May 4, 2015, both of which are incorporated herein by reference in their entireties.

FIELD

The present subject matter relates to tapes for use with insulation jacketing typically used for covering pipes. The present subject matter additionally relates to methods of forming securable insulation jackets using the tapes. The present subject matter also relates to methods of using the tapes such as by securing and sealing insulation jacketing.

BACKGROUND

Most heating and air conditioning units in dwellings, commercial buildings and industrial plants include cylindrical pipes which carry heated or cooled air, water or steam. In addition, in industrial applications, pipes may be used to carry these and other fluids. In most instances, particularly in more severe climates, these pipes must be insulated to prevent freezing, and/or to maintain the temperature of the fluid within the pipes, especially where the pipes are located along the exterior of buildings or exposed to adverse weather conditions.

Insulation segments may be used to insulate such pipes. These segments typically are cylindrical in shape and include an inner insulating layer surrounded by a jacket. In the center of the segments is a cylindrical passageway extending axially or longitudinally along the segment and having a diameter approximately equal to the outside diameter of the pipe to be insulated. A longitudinal slit k provided extending from one end of the segment to the other. This slit may be opened to avow insertion of the pipe therethrough and into the central passageway. The flap typically extends from one end to an opposite end of the segment. A flap is provided for covering the slit and for sealing the pipe within the segment. Such segments typically extend along a pipe in an end to end, abutting relationship to fully insulate and seal the pipe. Insulation segments with adhesive flaps can be used in "self sealing lap" (SSL) applications.

The inner insulating layer in each segment typically is formed of a fiberglass or mineral wool, a foamed cellular fiberglass or a rigid foam. The jacket which covers the insulating layer typically is formed of a metal or metalized foil, and/or a layer of kraft paper or the like including various polymeric films. In many applications the jacket material is an All Service Jacket (ASJ), which has layers that include paper, scrim, and aluminum foil and/or metalized polyester. Often, the metal or metalized layers and/or paper layers are laminated together to provide a weather-tight structure with a suitable tear and tensile strength. Typically the flap which covers the slit is merely an extension of the jacket and is formed of the same materials.

Often, the flap and/or the outer surface of the insulation jacket adjacent the slit is provided with a strip of adhesive or adhesive tape to bond the flap to the outer surface of the jacket to cover and seal the slit. The actual sealing of the flap to the jacket typically occurs at the job site when the insulation is installed. It is desirable, if not necessary, to keep the bonding surfaces of the flap and the opposing, outer surface of the jacket free from dirt and moisture to permit a tight seal. If the seal is not satisfactory, flap detachment can occur either as a result of the breakdown of the bond between the adhesive strip and the flap, or the bond between the adhesive strip and the outer surface of the jacket. This breakdown can produce delamination or disintegration of the jacket or the flap which can occur over a period of a few weeks in a very damp environment, or over a period of many months in less damp environments. If such flap detachment occurs, the insulation segments must be removed and replaced if the desired level of protection is to be maintained.

In view of these and other concerns, it would be desirable to provide new sealing assemblies for use with insulation jacketing and new methods of sealing for use with such insulation jacketing around pipes.

SUMMARY

The difficulties and drawbacks associated with previous approaches are addressed in the present subject matter as follows.

In one aspect, the present subject matter provides a tape assembly comprising a carrier having a first release face and a second release face. The tape assembly also comprises a primary adhesive disposed along the second release face of the carrier. The tape assembly additionally comprises a secondary adhesive disposed along the first release face of the carrier. And, the tape assembly further comprises a liner having a first release face and a second release face. The liner is disposed along the secondary adhesive.

In another aspect, the present subject matter provides a method of forming a securable insulation jacket. The method comprises providing an insulation jacket defining an inner face, an outer face, a first end, a second opposite end, and a flap extending between the first end and the second end. The method also comprises providing a tape assembly including (i) a carrier having a first release face and a second release face, (ii) a primary adhesive disposed along the second release face of the carrier, (iii) a secondary adhesive disposed along the first release face of the carrier, and (iv) a liner having a first release face and a second release face, the liner disposed along the secondary adhesive. The method also comprises adhering the primary adhesive of the tape assembly to the flap of the insulation jacket to thereby attach the tape assembly to the insulation jacket, and form a securable insulation jacket.

In yet another aspect, the present subject matter provides a method of securing insulation about an object. The method comprises providing an insulation jacket defining a flap extending between opposite ends of the jacket, the jacket including a tape assembly having (i) a carrier having a first release face and a second release face, (ii) a primary adhesive disposed along the second release face of the carrier, (iii) a secondary adhesive disposed along the first release face of the carrier, and (iv) a liner including a first release face and a second release face, the liner disposed along the secondary adhesive. The primary adhesive of the tape assembly is adhered to the flap of the jacket. The method also comprises positioning the insulation jacket about the object such that at least a portion of the tape assembly contacts another region of the insulation jacket. And, the method additionally comprises adhering the flap of the insulation jacket to the region of the insulation jacket to thereby secure insulation about the object.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

The present subject matter provides a unique tape assembly that is readily adhered to insulation jacketing and which enables the jacketing to be transported, fitted around piping, and subjected to operations such as cutting, positioning, and repositioning without contaminating an adhesive face that seals the jacketing about the pipe. The tape assembly of the present subject matter utilizes multiple release systems and multiple adhesives in a layered arrangement which is both economical and promotes ease of use. In many embodiments, the tape assembly comprises (i) a primary adhesive, (ii) a double release coated carrier, (iii) a secondary adhesive, and (iv) a double release coated liner. The double coated release coated carrier, i.e., item (ii), is disposed between the primary and secondary adhesives, i.e., items (i) and (iii) respectively. And, the double release coated liner, i.e., item (iv) is disposed on the secondary adhesive, i.e., item (iii). As explained in greater detail herein, instead of a double release coated carrier, a layer of a low surface energy material is used as the carrier. And, instead of a double release coated liner, a layer of a low surface energy material is used as the liner. Additional details of the various tapes and components of the tapes are provided herein.

The present subject matter also provides methods of forming insulation jackets that can be readily secured around pipes and similar articles. A manufacturer or supplier of insulation jacketing can form segments of the jackets by attaching lengths of the tape(s) to the jackets and particularly to flaps of the jackets.

The present subject matter also provides various methods of using the tapes such as by applying a tape to an insulation jacket. Typically, the tapes are applied to jackets by a manufacturer or supplier of the jackets as previously noted. The present subject matter additionally provides methods of sealing insulation jackets around pipes using the tapes. These and other aspects of the present subject matter are all described in greater detail herein.

Figure 1:
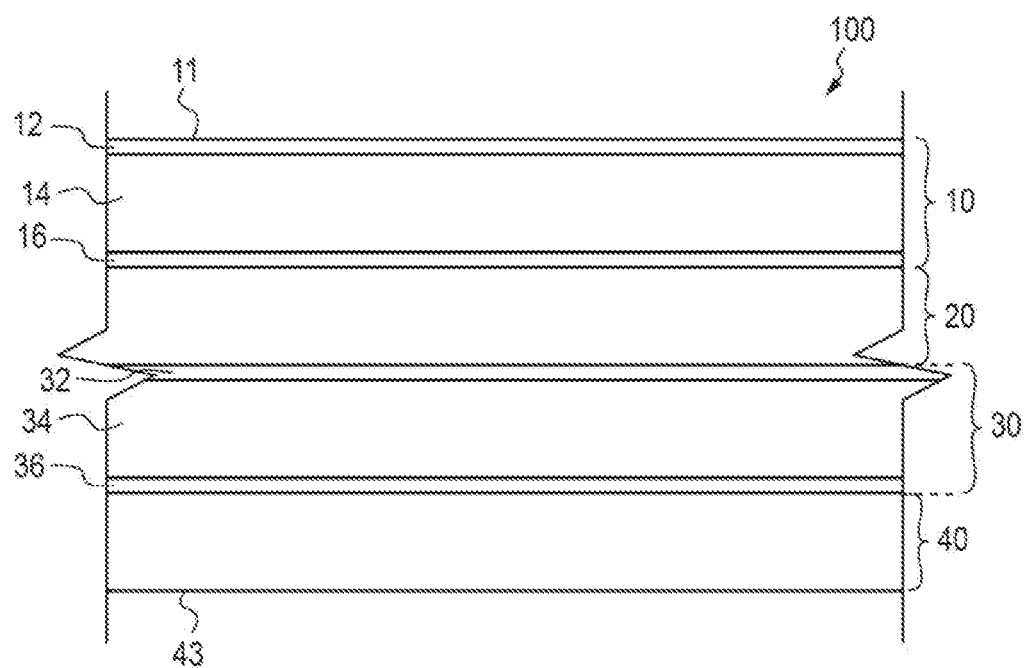
FIG. 1 is a schematic cross sectional view of a tape assembly in accordance with an embodiment of the present subject matter.

FIG. 1 is a schematic cross sectional view of a tape assembly 100 in accordance with an embodiment of the present subject matter. The tape assembly 100 comprises a double release coated liner 10, a secondary adhesive 20, a double release coated carrier 30, and a primary adhesive 40. The double release coated liner 10 includes a first release layer or face 12 and a second release layer or face 16, each of which are disposed on opposite faces of a liner 14. Similarly, the double release coated carrier 30 includes a first release layer or face 32 and a second release layer or face 36, each of which are disposed on opposite faces of a carrier 34. The secondary adhesive 20 is disposed between the liner 10 and the carrier 30, and specifically, between a first release layer 32 of the carrier 30 and a second release layer 16 of the liner 10. The primary adhesive 40 is disposed on, and immediately adjacent to, a second release layer 36 of the carrier 30. In the event that a low surface energy carrier is used for the double release coated carrier 30, then the first release layer 32 corresponds to a first release face of the low surface energy carrier, and the second release layer 36 corresponds to a second release face of the low surface energy carrier. Similarly, in the event that a low surface energy liner is used for the double release coated liner 10, then the first release layer 12 corresponds to a first release face of the low surface energy liner, and the second release layer 16 corresponds to a second release face of the low surface energy liner.

The present subject matter tapes can include additional layers and/or components and are not limited to components 10, 20, 30, and 40. For example, a liner (not shown) can be provided along face 43 of the primary adhesive 40. However, in many embodiments of the present subject matter, the tapes exclusively utilize components 10, 20, 30, and 40 and are free of any other layers or materials. That is, the tapes can in particular embodiments consist exclusively of components 10, 20, 30, and 40. For example, the tape 100 can be provided in a roll or stacked layer configuration in which the adhesive face 43 of the primary adhesive 40 is contacted with a release face 11 of the liner 10, thereby avoiding the need for a liner on face 43 of the adhesive 40.

In certain embodiments of the present subject matter, one or both of the primary adhesive and the secondary adhesive are pattern coated on a respective face of the double coated carrier such that a portion of a face (or faces) is free of adhesive. For example, in particular versions of the tapes, it may be beneficial to leave an edge portion of the carrier free of adhesive. Thus, in such versions, one or both peripheral longitudinal edge regions on one or both release layers 32 and 36, are free of adhesive. A nonlimiting example of an edge proportion free of adhesive can be from 2% to 20%, based upon the total width of the carrier. In certain applications such as when the tape is provided in bulk and in a roll or stacked sheet form, the adhesive-free edge regions also known in the art as "dry edge," or patterned adhesive reduce the potential for adhesive ooze.

Figure 2:
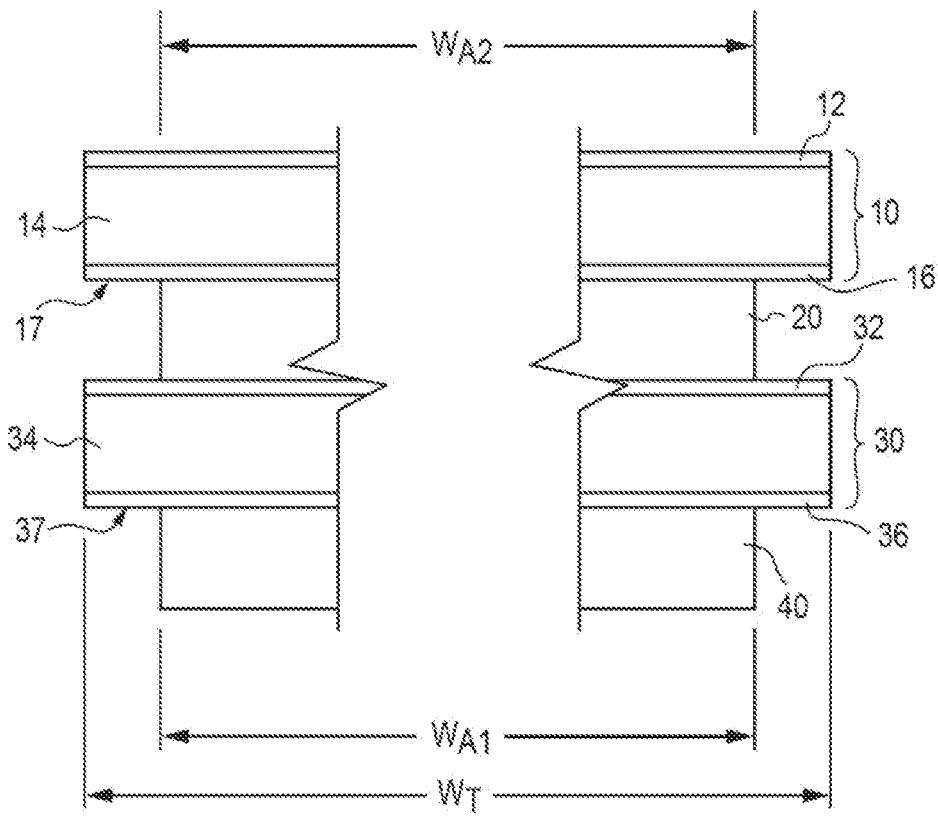
FIG. 2 is a schematic cross sectional view of a portion of the tape of FIG. 1 illustrating pattern coated adhesive layers.

Referring to FIG. 2, an example of such a pattern coating of adhesive is depicted. The primary adhesive 40 has a width $W_{A1}$ which is 80% to 98% of the width of the tape, $W_T$. Similarly, the secondary adhesive 20 has a width $W_{A2}$ which is 80% to 98% of the width of the tape $W_T$. It will be appreciated that the present subject matter includes pattern coating widths for either or both the adhesives 20, 40 less than 80% and/or greater than 98% of $W_T$. The "overhang" region of the liner 10 that extends beyond the adhesive 20 is shown in FIG. 2 as 17; and the overhang region of the carrier 30 that extends beyond the adhesive 40 is shown as 37. These regions may serve as fingerlifts in the tape assembly and facilitate grasping of the tape and/or separating layers of the tape. One or both of these overhang regions 17 and/or 37 may also be present along an opposite edge of the tape.

Figure 3:
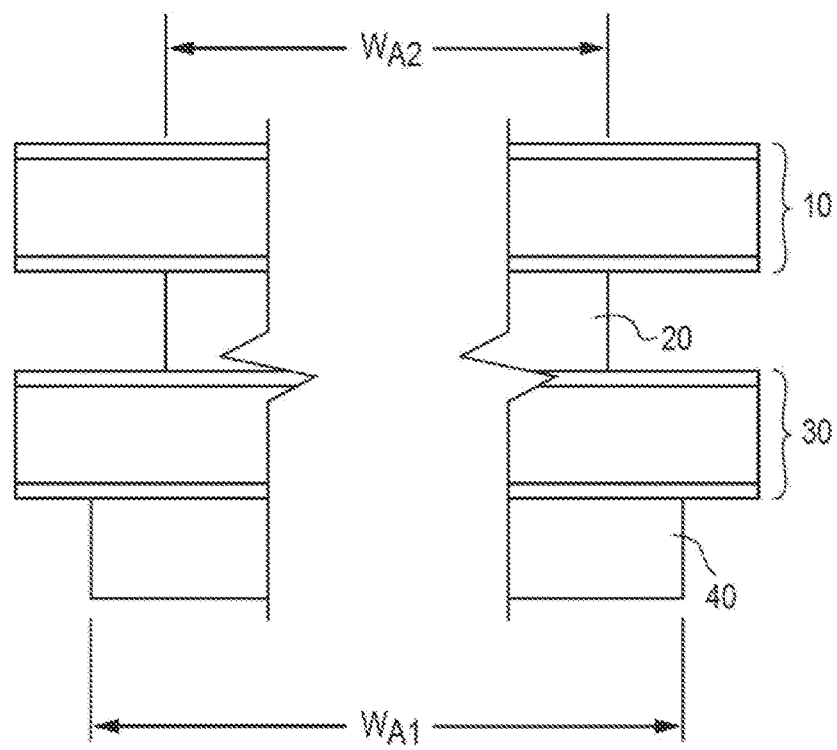
FIG. 3 is a schematic cross sectional view of a portion of the tape of FIG. 1 depicting other pattern coated adhesive layers.
Figure 4:
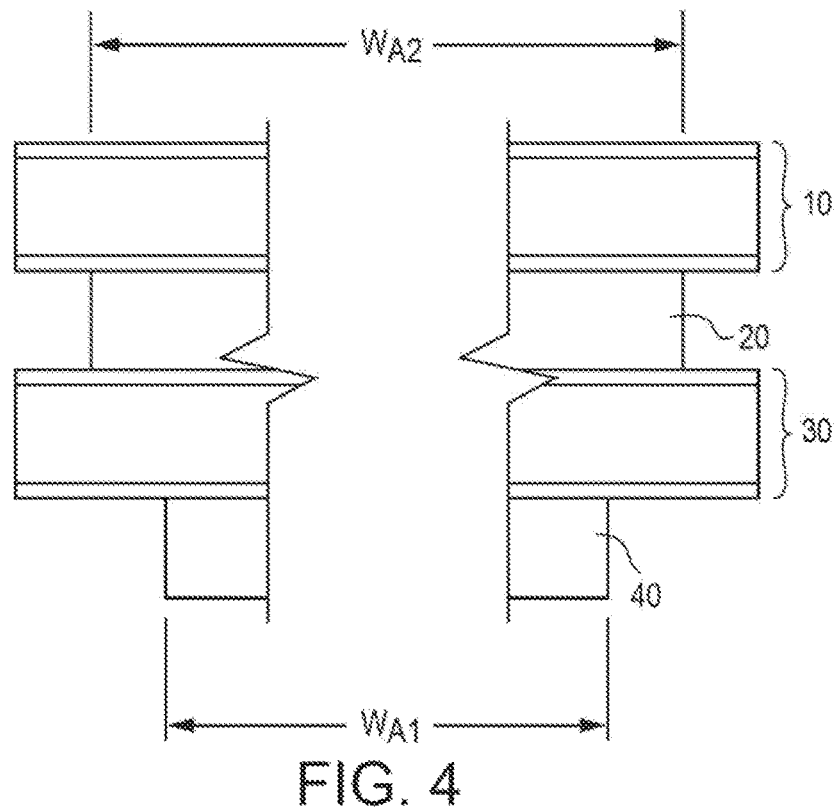
FIG. 4 is a schematic cross sectional view of a portion of the tape of FIG. 1 depicting still other pattern coated adhesive layers.

The present subject matter includes pattern coated adhesives 20 and 40 in which the adhesive layers have different widths, lengths, and/or arrangements. For example, FIG. 3 depicts adhesive layer 20 having a width $W_{A2}$ less than a width $W_{A1}$ of the adhesive layer 40. And, FIG. 4 depicts adhesive layer 20 having a width $W_{A2}$ greater than a width $W_{A1}$ of the adhesive layer 40.

Figure 5:
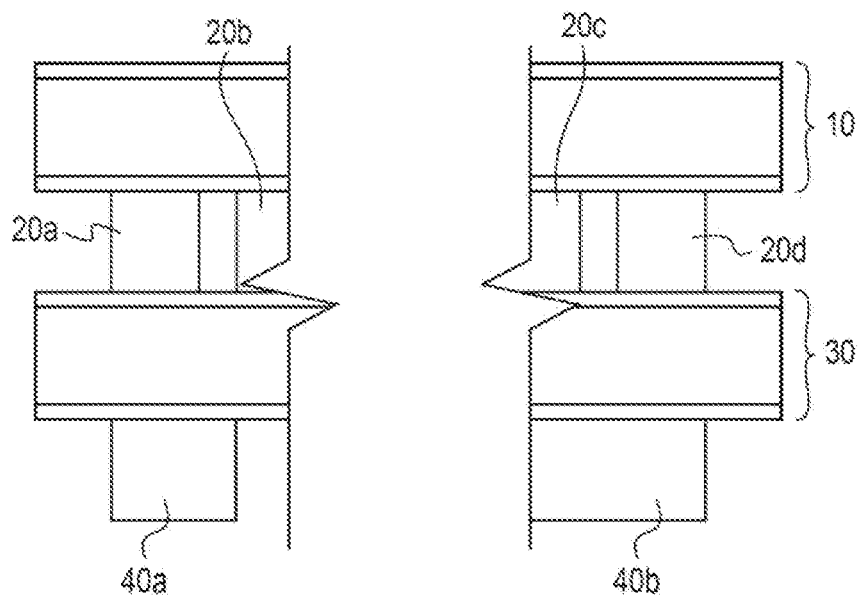
FIG. 5 is a schematic cross sectional view of a portion of the tape of FIG. 1 illustrating still other pattern coated adhesive layers.

The present subject matter also includes pattern coating one or both of the adhesive layers 20 and 40 so as to form multiple regions or "lanes." For example, FIG. 5 depicts pattern coating the adhesive 20 so as to form multiple lanes 20a, 20b, 20c, and 20d, spaced apart from one another. And FIG. 5 also shows pattern coating the adhesive 40 so as to form multiple lanes 40a and 40b, spaced apart from one another. These patterns or lanes can be varied in either a machine direction and/or in a cross web direction.

Figure 6:
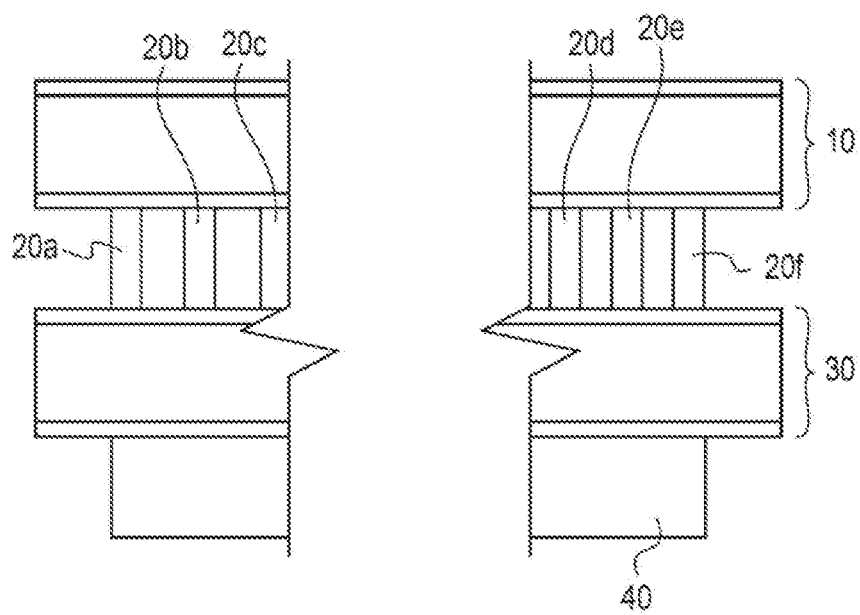
FIG. 6 is a schematic cross sectional view of a portion of the tape of FIG. 1 illustrating other pattern coated adhesive layers.

FIG. 6 illustrates pattern coating the adhesive 20 to form multiple lanes 20a, 20b, 20c, 20d, 20e, and 20f for example. The adhesive 40 is in the form of a continuous layer or region.

Figure 7:
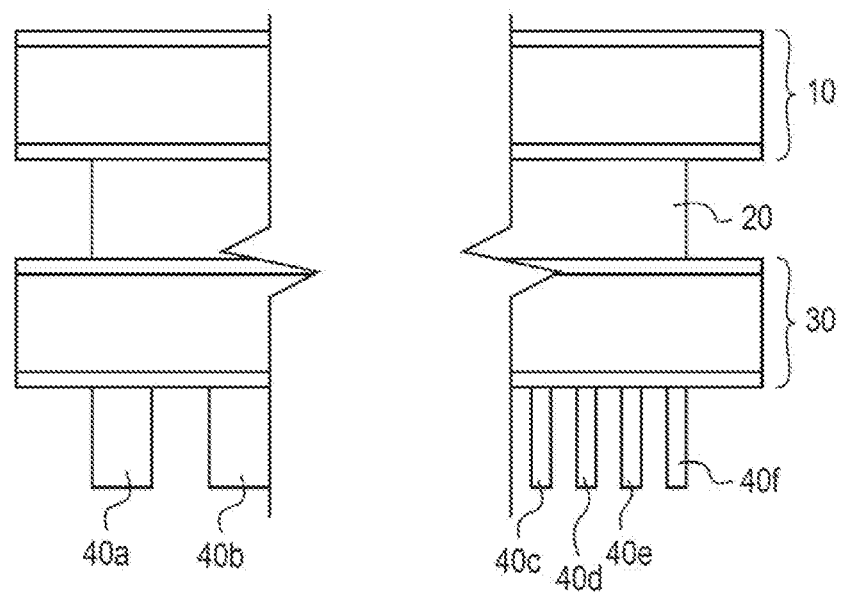
FIG. 7 is a schematic cross sectional view of a portion of the tape of FIG. 1 depicting other pattern coated adhesive layers.

FIG. 7 depicts pattern coating the adhesive 40 to form multiple lanes 40a, 40b, 40c, 40d, 40e, and 40f for example. The adhesive 20 is in the form of a continuous layer or region.

Figure 10:
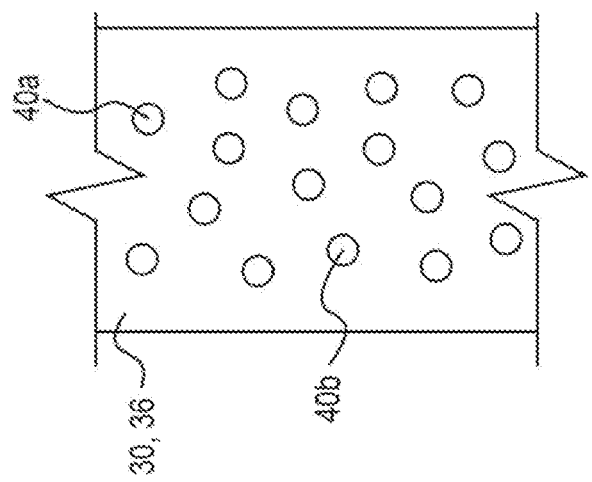
FIG. 10 is a planar view of a portion of the tape of FIG. 1 illustrating pattern coated adhesive layers.
Figure 9:
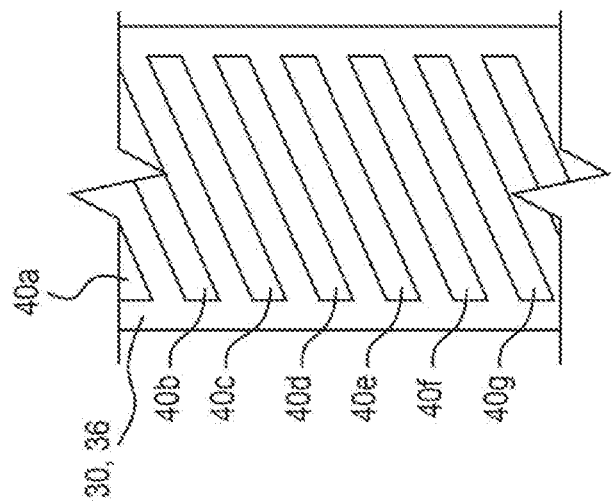
FIG. 9 is a planar view of a portion of the tape of FIG. 1 illustrating still other pattern coated adhesive layers.
Figure 8:
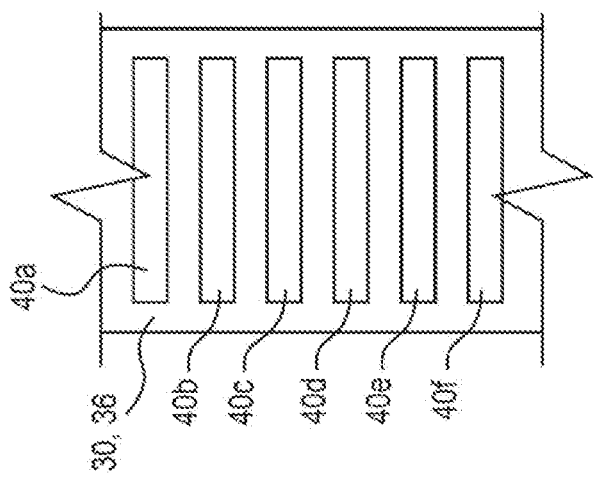
FIG. 8 is a planar view of a portion of the tape of FIG. 1 depicting still other pattern coated adhesive layers.
Figure 13:
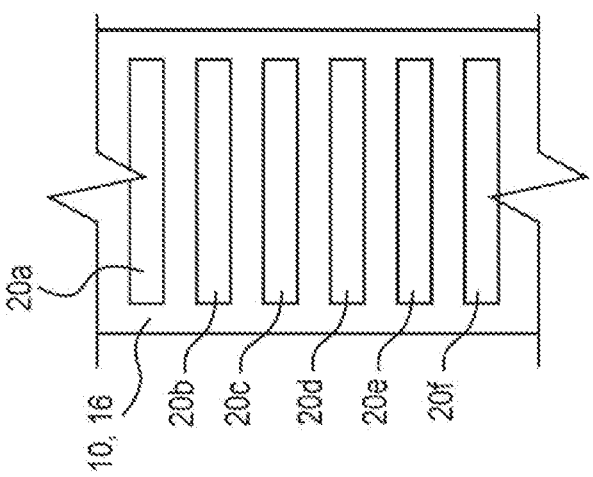
FIG. 13 is a planar view of a portion of the tape of FIG. 1 illustrating still other pattern coated adhesive layers.
Figure 12:
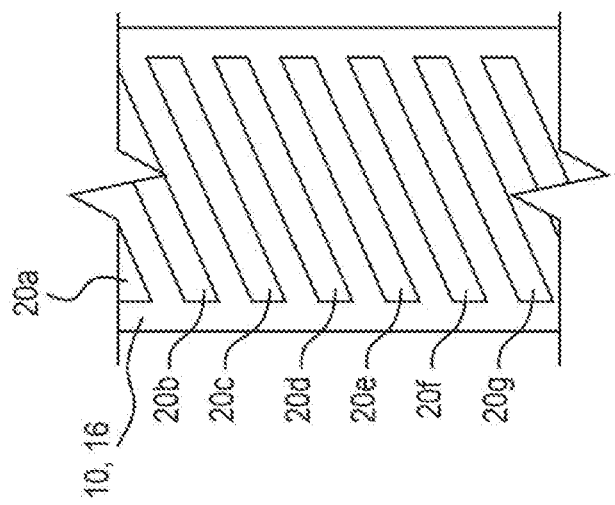
FIG. 12 is a planar view of a portion of the tape of FIG. 1 depicting still other pattern coated adhesive layers.
Figure 11:
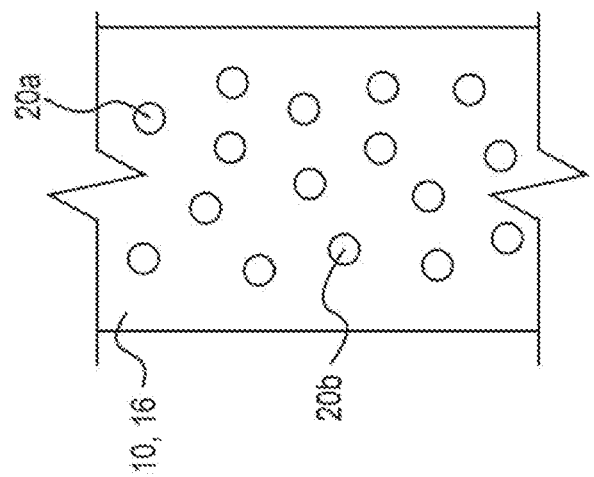
FIG. 11 is a planar view of a portion of the tape of FIG. 1 depicting other pattern coated adhesive layers.

FIGS. 8-13 schematically illustrate additional nonlimiting examples of pattern coating one or both adhesives 20 and/or 40. FIG. 8 is a schematic planar view of pattern coated adhesive 40 on a release layer 36 of the double release coated carrier 30. Specifically, a plurality of adhesive regions such as regions 40a, 40b, 40c, 40d, 40e, and 40f extend in a parallel fashion across a width of the carrier 30. FIG. 9 depicts an alternate arrangement in which adhesive regions 40a, 40b, 40c, 40d, 40e, 40f, and 40g extend at an angle with respect to a width span the carrier 30. The present subject matter also includes ordered, repeating, or nonrepeating arrangements of discrete "spots" or other shapes such as spots 40a and 40b of adhesive 40 disposed along a release layer 36 of the carrier 30 as shown in FIG. 10 for example. Similarly, FIG. 11 is a schematic planar view of pattern coated adhesive 20 on a release layer 16 of the double release coated liner 10. Specifically, a plurality of adhesive regions such as regions 20a, 20b, 20c, 20d, 20e, and 20f extend in a parallel fashion across a width of the liner 10. FIG. 12 depicts an alternate arrangement in which adhesive regions 20a, 20b, 20c, 20d, 20e, 20f, and 20g extend at an angle with respect to a width span of the liner 10. The present subject matter also includes ordered, repeating, or nonrepeating arrangements of discrete spots or other shapes such as spots 20a and 20b of adhesive 20 disposed along a release layer 16 of the liner 10 as shown in FIG. 13 for example.

Figure 14:
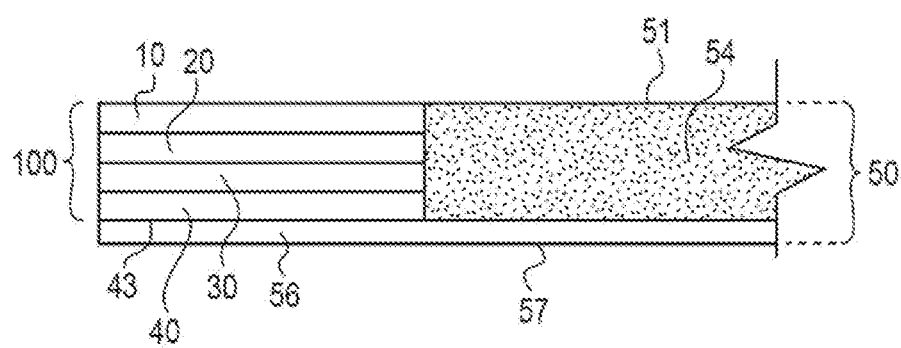
FIG. 14 is a schematic cross sectional view illustrating application of the tape of FIG. 1 to typical insulation jacketing.

FIG. 14 is a schematic cross sectional view depicting the tape assembly 100 of FIG. 1 applied to insulation jacketing 50. The insulation jacketing 50 includes insulation 54 and an outer layer 56 which is typically a paper or polymeric film layer. The outer layer 56 typically extends beyond an edge of the insulation to form a flap. Multiple layers of scrim (threads), foil, films, and/or paper may be disposed along the insulation 54. Optionally, an inner layer (not shown) can be provided that is typically in the form of a metal foil. These layers give strength, tear and puncture resistance, in addition to MVTR (moisture vapor transmission rate) reductions, among other traits to seal the insulation. The insulation 54 defines an inner face 51. And, the outer layer 56 defines an outer face 57. The tape 100 is applied to the insulation jacketing 50 by contacting and adhering the primary adhesive 40 to the inner face 51. Specifically, the adhesive face 43 of the primary adhesive 40 is contacted with, and adhered to, an inner face of the outer layer 56 along the flap.

Additional details of each of the components of tapes of the present subject matter are as follows.

Primary and Secondary Adhesives

The adhesive(s) used for the primary and secondary adhesives, i.e., adhesives 40 and 20, respectively, are typically pressure sensitive adhesives. A description of useful pressure sensitive adhesive may be found in *Encyclopedia of Polymer Science and Engineering*, Vol. 13, Wiley-interscience Publishers (New York, 1988). Additional description of useful PSAs may be found in *Encyclopedia of Polymer Science and Technology*, Vol. 1, Interscience Publishers (New York, 1964).

A wide array of adhesives can be used for the primary and secondary adhesives. These adhesives can be acrylic adhesives, rubber adhesives, and/or silicone adhesives as well as hybrid combinations of such adhesives. Although the present subject matter includes the use of the primary adhesive being one of an acrylic, rubber, or silicone adhesive and the secondary adhesive being one of those types but different than the primary adhesive, in many embodiments the primary and secondary adhesives are of the same type. Thus, for example, if the primary adhesive is an acrylic adhesive, in many embodiments the secondary adhesive is also an acrylic adhesive.

The functional and performance characteristics of the primary and secondary adhesive are typically dictated by the end use applications of the tapes. However, for many applications, the base polymers of the adhesives used in the tapes exhibit a glass transition temperature (Tg) within a range of from −60° F. to about 20° F., more particularly from −50° F. to 0° F. and in certain embodiments from −40° F. to −10° F. An adhesive having a Tg of about −38° F. has been found suitable for many applications. These Tg values are measured by Dynamic Mechanical Analysis (DMA) as known in the art. However, it will be appreciated that the present subject matter includes the use of adhesive polymers exhibiting glass transition temperatures outside of these ranges.

Acrylic Adhesives

In one embodiment, the adhesive may be formed from an acrylic based polymer. It is contemplated that any acrylic based polymer capable of forming an adhesive layer with sufficient tack to adhere to a substrate may function in the present subject matter. In certain embodiments, the acrylic polymers for the pressure sensitive adhesive layers include those formed from polymerization of at least one alkyl acrylate monomer containing from about 4 to about 12 carbon atoms in the alkyl group, and present in an amount from about 35-95% by weight of the polymer or copolymer, as disclosed in U.S. Pat. No. 5,264,532. Optionally, the acrylic based pressure sensitive adhesive might be formed from a single polymeric species.

Advantageously, the glass transition temperature of a pressure sensitive adhesive layer comprising acrylic polymers can be varied by adjusting the amount of polar, or "hard monomers", in the copolymer, as taught by U.S. Pat. No. 5,264,532. The greater the percentage by weight of hard monomers in an acrylic copolymer, the higher the glass transition temperature. Hard monomers contemplated useful for the present subject matter include vinyl esters, carboxylic acids, and methacrylates, in concentrations by weight ranging from about zero to about 35% by weight of the polymer.

The acrylic adhesives may contain as a major constituent acrylic type polymers containing carboxylic acids which are obtained from vinyl type monomers containing carboxyl groups such as acrylic acid, methacrylic acid, etc., and acrylic type polymers containing hydroxyl groups which are obtained from vinyl type monomers containing hydroxyl groups such as 2-hydroxyethyl methacrylate, etc. In one embodiment, the acrylic adhesive material is obtained from the copolymerization of an alkyl acrylate such as butyl acrylate, 2-ethylhexyl acrylate, or isononyl acrylate; a polar monomer such as acrylic acid, acrylamide, or N-vinyl-2-pyrrolidone, and another monomer such as an acrylate other than the acrylate mentioned above, methacrylate, styrene, vinyl acetate, etc.

In certain embodiments, one copolymer comprises from about 50% to about 75% butyl acrylate, from about 20% to about 50% methyl methacrylate, and from about 0.1% to about 10% acrylic acid. In certain versions of the adhesive composition, the copolymer includes 62% butyl acrylate, 35% methyl methacrylate, and 3% acrylic acid. However, it will be appreciated that the present subject matter includes other compositions and formulations.

Another copolymer includes from about 70% to about 95% butyl acrylate, from about 5% to about 30% methyl methacrylate, and from about 0.1% to about 10% acrylic acid. In certain versions of the adhesive composition, the copolymer includes 82% butyl acrylate, 15% methyl methacrylate, and 3% acrylic acid. However, it will be appreciated that the present subject matter includes other compositions and formulations.

It is also contemplated that instead of or in addition to butyl acrylate and/or methyl methacrylate, appropriate amounts of 2-ethyl hexyl acrylate and/or isooctyl acrylate could be used. It is also contemplated that appropriate amounts of vinyl acetate and/or ethyl acetate could be used in place of, or in addition to, one or more of the acrylate monomers forming the copolymer(s) of interest. Furthermore, it will be appreciated that instead of using methyl methacrylate in either or both of the copolymers of interest, appropriate amounts of methyl acrylate could be used. Moreover, any suitable ester of methacrylic acid could be used. Similarly, any suitable equivalent for butyl acrylate could potentially be used in the present subject matter adhesive compositions.

The two copolymers are blended with each other in a weight proportion of from about 5:95 to about 95:5. In certain versions, the adhesive includes the two copolymers blended at a weight proportion of from about 40:60 to about 60:40 with respect to each other.

Upon blending the two copolymers, an overall ratio of butyl acrylate to methyl methacrylate can be determined. In certain versions of the adhesive compositions, the total weight percent of butyl acrylate is from about 20% to about 80%, the total weight percent of methyl methacrylate is from about 40% to about 80%, and the total weight percent of acrylic acid is from about 0.1% to about 10%. It will be understood that the present subject matter includes other compositions and formulations. Adjusting the ratio of butyl acrylate to methyl methacrylate (or methyl acrylate) enables selection of desired glass transition temperatures of the resulting adhesive composition while still achieving adequate adhesion and wet-out properties of the adhesive.

Although the adhesives are generally described as including a blend of two partially immiscible acrylic copolymers, it will be appreciated that the present subject matter includes the use of more than two such copolymers.

The various adhesive compositions can optionally include one or more ancillary components such as, but not limited to modifying resins, fillers, crosslinking agents, plasticizers, tackifiers, and other additives.

Blending of the acrylic copolymers and any additional components such as modifying resins is performed by any method that results in a substantially homogeneous distribution of the acrylic copolymers and modifying resin(s) for example in the coated adhesive. The blend can be prepared by solvent blending, hot melt blending, emulsifying, etc. In the case of solvent blending, the copolymers should be substantially soluble in the solvents used.

Rubber Adhesives

In certain embodiments, the adhesive used for the primary adhesive and/or the secondary adhesive comprises one or more rubber elastomers and a tackifier. The rubber elastomer(s) is generally present in an amount from about 20% to about 48%, or from about 25% to about 40%, or from about 28% to about 37% by weight of the adhesive, Useful rubber elastomers include the block polymers of styrene and dienes, as well as ethylene-propylene elastomers, including diene terpolymers, styrene olefin copolymers like styrene ethylene, propylene or butylene block polymers. Styrene diene polymers are particularly useful, such as styrene isoprene copolymers and styrene butadiene copolymers.

In another embodiment, the rubber elastomer comprises a mixture of triblock and diblock copolymers. The rubber elastomers are generally styrene isoprene or styrene butadiene block copolymers. The triblock content is typically from about 30% to about 70%, or from about 35% to about 65%, or from about 40% to about 60% by weight of the rubber elastomer. The diblock content is from about 70% to about 30%, or from about 65% to about 35%, or from about 60% to about 40% by weight of the rubber elastomer.

In one embodiment of the present subject matter, the adhesive comprises a mixture of two immiscible natural or synthetic elastomers, one based on a first polydiene, exhibiting a first glass transition temperature and a first value of tangent delta and the other based on a second polydiene, exhibiting a second glass transition temperature higher than the first and a second value of tangent delta associated therewith. A particularly useful first elastomer is polybutadiene and a particularly useful second elastomer is polyisoprene. The two elastomers are combined in proportion whereby there is exhibited two distinct glass transition temperature peaks in a DMS curve, a plot of tangent delta as a function of temperature. There is added to the composition a tackifying system that comprises tackifiers preferentially soluble in the second polydiene component that cause the temperature differential between the glass transition temperature peaks in the DMS curve to increase and the amplitude of the tangent delta for the second glass transition temperature to also increase. The net result is to provide a pressure sensitive adhesive composition exhibiting improved conversion as seen in ability to cut the adhesive and, because of tangent delta peaks at low temperature approaching ambient, respective excellent low and ambient temperature pressure sensitive adhesive performance. Such removable adhesives are described in detail in U.S. Pat. Nos. 5,290,842 and 5,553,228.

The tackifier system of this embodiment consists of tackifiers that are preferentially miscible with the polydiene having the highest glass transition temperature (polyisoprene) and serves by preferential tackification to increase differential between the peaks and amplify the peak of the highest glass transition temperature. The tackifier system may also include normally liquid and solid tackifiers that leave unchanged or increase the glass transition temperature of the polyisoprene block and plasticizer oils which lower the glass transition temperature of the polyisoprene segment. Tackifier systems useful for this embodiment, while including conventional tackifiers and plasticizer oils, must have the net effect of being preferentially soluble in the polyisoprene block so as to preferentially increase the difference between the glass transition temperature of the polyisoprene block component relative to the polybutadiene block component, with an increase (amplification) of the tangent delta of the polyisoprene peaks of the pressure sensitive adhesive composition.

The polymers used in formulating the pressure sensitive adhesives of this embodiment are based on natural and/or synthetic elastomeric polymers. Useful are AB, ABA and (AB)x block copolymers wherein x has a value of 3 or more and wherein A is a block comprising at least one monoalkenyl arene, preferably styrene, alpha methyl styrene, vinyl toluene and the like, and B is an elastomeric conjugated diene block, and in many embodiments a polybutadiene or a polyisoprene block. In certain embodiments, at least one is based on polybutadiene blocks and one other is based on polyisoprene blocks. These include, but are not limited to, homopolymers, block, random or multiarmed copolymers, and mixtures thereof. Among the useful elastomeric polymers there may be mentioned natural rubber (polyisoprene), polybutadiene, synthetic polyisoprene, random styrene-butadiene polymers, styrene-butadiene (SB) block copolymers, multiarmed and repeating (SB) copolymers, styrene-butadiene-styrene (SBS) block copolymers, styrene-isoprene (SI) block copolymers, styrene-isoprene-styrene (SIS) block copolymers, multiarmed styrene-isoprene (SI)x block copolymers, and the like. It will be understood that random copolymers may also be used and can reverse the diene preferentially tackified so long as the glass transition temperature of the polymer exhibiting the highest glass transition temperature is increased relative to the polymer of lower glass transition temperature.

Commercial elastomeric polymers used include linear SIS/SI block copolymers known as Kraton D-1107 and D-1112, SBS/SB block copolymers known as Kraton D-1101, D-1102 and DX-1300, and an (SI)x block copolymer known as Kraton D-1320x, all manufactured and sold by Shell Chemical Company, and an SB block copolymer known as Solprene 1205 manufactured and sold by Housemex, Inc. As indicated, in many of the SIS or SBS block copolymers, there are respectively present SI or SB components.

Other elastomers, such as the ethylene-propylene diene rubbers, styrene-ethylene/butylene, styrene block copolymers, styrene-ethylene/propylene-styrene block copolymers and the like, may also be used.

The weight ratio of the polybutadiene containing constituents of the mixture to the polyisoprene constituents of the mixture are such that there are provided two peaks on the DMS curve for the mixture. Generally, weight ratios range from about 0.5:1 upward. Compositions contemplated to be used in accordance with the present subject matter are combined in ratios of about 0.5:1 to about 5:1, or about 1:1 to about 1.5:1, or from about 1.3:1.

Tackifier additives for the polyisoprene component are obtained by the polymerization of a stream of aliphatic petroleum derivatives in the form of dienes and monoolefins containing 5 or 6 carbon atoms generally in accordance with the teachings of U.S. Pat. No. 3,577,398 to Pace and U.S. Pat. No. 3,692,756 to St. Cyr. The resultant hydrocarbons range from materials that are normally liquid at room temperature to those that are normally solid at room temperature and typically contain 40% or more by weight polymerized dienes. The dienes are typically piperylene and/or isoprene. They are sold by the Chemical Division of Goodyear Tire and Rubber Company as the Wingtack family of resins with the numerical designation being the softening point, e.g., Wingtack 95 which is normally a solid resin having a softening point of about 95° C. and Wingtack 10 which is normally a liquid resin having a softening point of about 10° C.

Other normally solid tackifiers are Escorez 1310 LC manufactured by Exxon and Piccotac 95 manufactured by Hercules.

Other additives that serve a tackifier function include hydrogenated aromatic resins wherein a very substantial portion, if not all, of the benzene rings are converted to cyclohexane rings (for example, the Regalrez family of resins manufactured by Hercules such as Regalrez 1018, 1033, 1055, 1078 and 1126, and Regalite R-100, and the Arkon family of resins from Arakwa Chemical such as Arkon P-85, P-100, P-115 and P-125), hydrogenated polycyclic resins (typically dicyclopentadiene resins such as Escorez 5300, 5320, 5340 and 5380 manufactured by Exxon) and the like.

There can be also added rosins, rosin esters, polyterpenes and other tackifiers that are compatible to some degree with the polyisoprene and polybutadiene phases. Other additives include plasticizer oils such as Shellflex 371 manufactured by Shell and Kaydol mineral oil manufactured by Witco which are soluble in both the polyisoprene and polybutadiene phases.

The tackifier system may be present in an amount, based on the total weight of tackifier system and elastomers, of from about 50% to about 80% by weight, or from about 50% to about 70% by weight, or from about 60% to about 70% by weight. In one embodiment, the ratio is about 38% by weight elastomer and about 62% by weight tackifying resin additive, the resin additive comprising a mixture of a normally solid tackifier such as Wingtack 95 of Escorez 1310 LC and a normally liquid tackifier such as Wingtack 10 or a plasticizer oil such as Shellflex 371. Polystyrene reinforcing additives may be present but are not required.

Silicone Adhesives

Silicone pressure sensitive adhesives (PSA's) are typically produced by either blending or condensing together a silicone resin and a silicone polymer. These types of silicone pressure sensitive adhesives have been disclosed for example in U.S. Pat. Nos. 2,736,721; 2,814,601; 2,857,356; and 3,528,940.

Silicone pressure sensitive adhesives suitable for use herein are well known in the art. In brief, these adhesives contain a mixture of silicone resins and silicone fluids. The silicone resins are generally referred to as MQ resins which contain M units, represented by the formula $R_3SiO_{1/2}$, and Q units, represented by the formula $SiO_{4/2}$, where R is a monovalent hydrocarbon radical. Generally, such resins contain 1 to 2 Q units for each M unit. The silicone fluids are linear, high viscosity organopolysiloxane fluids having a viscosity between about 50,000 and 3,000,000 centipoise and containing terminal silicon-bonded hydroxyl groups used for co-reacting with the above described MQ resins.

These silicone pressure sensitive adhesives are blended and cured by reacting the resins with the fluids in a condensation reactor. Typically, for each part by weight of resin, there is added from 0.5 to 6 parts by weight fluid.

Silicone cross-linking agents for use herein include the organic peroxides and alkoxy silanes. The use of either cross-linking agent will increase the cross-link density of the silicone adhesive and the shear strength of the adhesive.

Suitable peroxide cross-linking agents include diaroyl peroxides, such as dibenzoyl peroxide, di-p-chlorobenzoyl peroxide, and bis-2,4-dichlorobenzoyl peroxide; dialkyl peroxides such as di-t-butyl peroxide and 2,5-dimethyl-2,5-di-(t-butylperoxy)-hexane; diaralkyl peroxides such as dicumyl peroxide; alkyl aralkyl peroxides such as t-butyl cumyl peroxide, and 1,4-bis(t-butylperoxyisopropyl)-benzene; alkyl aroyl and alkyl acyl peroxide such as t-butyl perbenzoate, t-butyl peracetate, and t-butyl peroctoate; and other peroxides such as peroxy siloxanes and peroxy carbonates. Suitable peroxides and the methods of use are disclosed in U.S. Pat. Nos. 2,448,565; 2,723,966; and 2,480,620.

In many embodiments, the silicone pressure sensitive adhesive phase should not be cross-linked beyond the point where it is no longer tacky on the surface. Thus, persons skilled in the art must adjust the amount of peroxide cross-linking agent utilized, the heat of peroxide cure, the shear strength desired, and the resultant tack. Generally, from about 0.1 to about 3% by weight of peroxide based on silicone may be used.

Suitable alkoxy silane cross-linking agents are known in the art and crosslink the silicone pressure sensitive adhesive through a condensation reaction with Si—OH end groups. The preferred cross-linking agents are methoxy- and ethoxysilanes such as methyltrimethoxy silane, ethyl silicate, gamma-aminopropyltrimethoxy silane, triethoxy silane, etc. The alkoxy cross-linking agents require a cross-linking catalyst such as amines or carboxylic acid salts of metals including Pb, Zn, Zr, Sb, Fe, Cd, Sn, Ba, Ca, and Mn, particularly the naphthenates, octoates, hexoates, laurates, and acetates thereof. Tin (II) octoate and dibutyltin dilaurate are particularly satisfactory. Amine substituted cross-linking agents such as gamma-aminopropyltrimethoxy silane are self-catalyzing.

In many embodiments, the silicone pressure sensitive adhesive should not be cross-linked past the point where there is no longer tack. Generally, the alkoxy silane cross-linking agent is employed in amounts ranging from about 1 to about 10% by weight based on the silicone pressure sensitive adhesive. The metal cross-linking catalyst should be present in amounts ranging from about 1 to about 1000 weight parts per one million parts by weight of silicone pressure sensitive adhesive and acrylic pressure sensitive adhesive.

As manufactured, the silicone adhesive material should be carried in a non-polar solvent. Thus, to handle the silicone adhesive, there is required at least about 1 part by weight non-polar solvent for 10 parts by weight silicone adhesive. Suitable non-polar solvents include toluene, xylene, etc. In many applications there is used from 2 to about 9 parts by non-polar solvent for each 10 parts by weight silicone adhesive.

Other materials in addition to the foregoing resins may be included in the pressure sensitive adhesive materials. These include solid tackifying resins, liquid tackifiers (often referred to as plasticizers), antioxidants, fillers, pigments, waxes, etc. The adhesive materials may contain a blend of solid tackifying resins and liquid tackifying resins (or liquid plasticizers).

Regardless of the type of adhesive, i.e., acrylic, rubber and/or silicone, in many embodiments both the primary adhesive and the secondary adhesive are applied at coatweight(s) within a range of from 15 grams/square meter (gsm) to 75 gsm, in particular embodiments from 20 gsm to 65 gsm, and in certain versions from 28 gsm to 46 gsm. It will be understood that the coatweight of the primary adhesive may be different than that of the secondary adhesive. Alternatively, the coatweights may be the same. Furthermore, it will be understood that the present subject matter includes coatweights for the adhesives less than 15 gsm and/or greater than 75 gsm. For example, if a rubber adhesive is used, the coatweight will tend to be greater, thereby resulting in a greater thickness for that adhesive layer. A nonlimiting thickness range for either the primary adhesive or the secondary adhesive is from about 1.5 mils to about 2.7 mils.

Double Release Coated Carrier or Low Surface Energy Carrier

The double coated carrier, i.e., carrier 30, can in certain embodiments include first and second release layers 32 and 36 respectively, and a carrier 34. Each of these are as follows.

In many embodiments, the release layers include silicone release coating compositions. The major components of such silicone release coating compositions are polyorganosiloxanes and, in one embodiment, polydimethylsiloxanes. The silicone release coating compositions used in the tapes of the present subject matter may be moisture cured, thermally cured, or radiation cured. Generally, the moisture curable and thermally curable compositions comprise at least one polyorganosiloxane and at least one catalyst (or curing agent) for such polyorganosiloxane(s). Such compositions may also contain at least one cure accelerator and/or adhesivity promoter (sometimes referred to as an anchorage additive). As is known in the art, some materials have the capability of performing both functions, i.e., the capability of acting as a cure accelerator to increase the rate, reduce the curing temperature, etc., and also as an adhesivity promoter to improve bonding of the silicone composition to the substrate. The use of such multifunctional additives where appropriate k within the purview of the present subject matter.

A wide variety of polyorganosiloxanes, which are sometimes referred to as silicones, can be used. Such polyorganosiloxanes are also sometimes referred to as polymeric silicone resins, rubbers, oils or fluids. These compositions are well known and fully described in the literature. These compositions are comprised essentially of silicon atoms connected to each other by oxygen atoms through silicon oxygen linkages, e.g.,

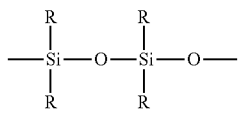

wherein each R is an organic group, generally an alkyl group. The compositions used in the present subject matter can include polymers and copolymers having molecular weights in the range of about 5,000 to about 250,000. These polymers and copolymers should not have obtained such a degree of polymerization or condensation that they are no longer soluble in common hydrocarbon solvents such as xylene, toluene, methyl ethyl ketone, and carbon tetrachloride. In general, any organic solvent having a boiling point equal to or less than that of xylene can be used in the compositions used in the present subject matter. The solvent merely serves as a convenient vehicle or carrier for uniform application to the substrate. Thus, higher boiling solvents can be used but require so much time for their control that their use is not commercially economical. Various polyorganosiloxanes are commercially available in organic solvents in various percent solids concentration. Exemplary of the polyorganosiloxane materials which can be used in forming the silicone release coating compositions of the present subject matter are those disclosed in U.S. Pat. Nos. 2,258,218; 2,258,220; 2,258,222; 2,494,920; 3,432,333; and 3,518,325.

Suitable catalysts which can be employed in the curing of the silicone release compositions include various compounds containing metals such as tin, lead, platinum, rhodium, etc. Generally, the catalysts are tin, platinum or rhodium compounds such as the dialkyl tin esters. Specific examples of catalysts include: dibutyl tin diacetate, dibutyl tin di-ethylhexanoate, dihexyl tin di-2-ethyl hexanoate, ethyl tin trihexanoate, dibutyl tin dilaurate, octadecyl tin dilaurate, dibutyl tin diacetate, tri-butyl tin acetate, dibutyl tin succinate, various lead salts such as lead naphthenate and lead octoate, zinc octoate, zinc stearate, iron octoate, various organic peroxides such as benzoyl peroxide and 2,4-dichlorobenzoyl peroxide, and others well known in the art as curing agents or catalysts for polyorganosiloxane (silicone) materials. Useful catalysts include the carboxylic acid salts of organotin compounds containing at least one carbontin bond such as those previously mentioned. Metal complexes of platinum and rhodium are also useful. Amines and amines derivatives such as diethylene triamine, triethylene tetramine and ethanol amine, as well as amine precursors such as the isocyanate compounds and amine-functional silanes such as gamma-aminopropyl triethoxy silane can also be used as curing catalysts. Amine salts of carboxylic acids can also be used. In one embodiment, the catalyst is a platinum metal complex.

The cure accelerators and/or adhesivity promoters which can be used in the silicone release coating compositions are also well known in the art. Exemplary of such cure accelerators and/or adhesivity promoters are amines, amine-functional silanes and amine precursors previously discussed as well as other silane derivatives such as acetoxy-functional silanes of the type vinyl $Si(OOCCH_3)_3$ and orthosilicates such as tetra(diethylene glycol monomethyl ether) silane. Orthosilicates which have been found to be advantageous include ethylene glycol derivatives having the formula $Si[(OC_2H_4)_2OR]_4$, wherein R is alkyl or alkenyl radical having up to 8 carbon atoms, e.g., methyl, ethyl, isopropyl, butyl, octyl, vinyl, allyl, etc., and $Si(OCH_2H_4OR_1)_4$ wherein $R_1$ is an alkyl or alkenyl radical having up to 8 carbon atoms, e.g., methyl, propyl, butyl, pentyl, hexyl, allyl, pentenyl, etc. Isocyanate compounds which have been found to be effective can include any isocyanate which is soluble in organic solvents and which has an average of at least two isocyanate groups per molecule. Such isocyanates can be monomeric or polymeric in nature, e.g., the isocyanate can be a partially hydrolyzed toluene diisocyanate. In other words, a urea or polyurea which still retains isocyanate groups in the molecules or a polybiuret containing unreacted isocyanate groups are typical of the isocyanate compound which can be used. Other such isocyanates include the reaction products of an isocyanate with a polyhydroxyl compound (i.e., a polyurethane or allophanates derived therefrom), the reaction product of an isocyanate and a polyamine which reaction products contain unreacted isocyanate groups. In addition the isocyanate can be a polymeric material in which the polymerization is effected by mechanisms not involving the isocyanate group.

At least some of these compounds also function as curing catalysts per se as well as cure accelerators and/or adhesivity promoters. The amount of curing agent or catalyst, cure accelerator and/or adhesivity promoter employed in the silicone release coatings can be varied widely depending upon the curing temperature, the particular catalyst used, the particular polyorganosiloxane materials selected, the particular cure accelerator and/or adhesivity promoter used, the substrate, desired curing time, etc. Usually the amount of any of such components will be in the range of 0.5 to 20 weight percent of the silicone material employed.

Curing of the polyorganosiloxane coating material can take place at room temperature depending upon the particular silicone material used and the particular curing agent or catalyst used in conjunction with the silicone material. To avoid premature curing of silicones, the selected catalyst is typically hindered with molecules that act as inhibitors. At elevated temperatures these inhibitors disassociate from the catalyst thereby initiating the silicone cure reaction. However, for practical continuous operations the time required for curing at room temperature is generally too long. Most curing agents or catalysts are capable of promoting relatively rapid curing at moderate elevated temperatures. This temperature at which relatively rapid curing takes place is sometimes referred to as the curing initiating temperature even though curing will take place at room temperature. Polyorganosiloxanes that cure in the temperature range of about 70° C. to about 180° C. can be used. Non-inhibited systems (i.e., systems not containing an inhibitor) can be used with the present subject matter and cured at or near ambient temperatures. The choice of temperature actually employed in the curing steps will depend upon a number of factors such as the type of silicone coating material used, the curing catalyst used with said silicone material, and the rate at which the coated substrate is passed through the heating zone.

The radiation-curable silicone release compositions that are useful can be cured by ultraviolet or electron beam radiation with or without the assistance of a photoinitiator such as benzophenone. One type of polyorganosiloxane which is useful in preparing radiation-curable release coatings contains acryloxy groups, methacryloxy groups, or combinations thereof. A variety of acryloxy or methacryloxy containing polyorganosiloxanes are known and can be used. These polyorganosiloxanes are typically fluids which have viscosities in the range of from about 25 cps to 10,000 cps, Polyorganosiloxanes of this type are described in U.S. Pat. Nos. 3,878,263; 4,064,286; 4,301,268; 4,306,050; 4,908, 274; 4,963,438; 4,978,726; and U.S. Pat. No. 5,034,491 which describe acrylate or methacrylate containing polyorganosiloxanes and methods of preparing polyorganosiloxanes containing acryloxy and/or methacryloxy groups.

Polyorganosiloxanes containing acryloxy and/or methacryloxy groups are available commercially from, for example, Goldschmidt Chemical Corp., Hopewell, Va. Goldschmidt's silicone acrylate series include polydimethylsiloxanes available under the general trade designation Terg® RC, and more particularly, under designations such as RC 450, RC 450N, RC 706, RC 707, RC 710, RC 720 and RC 726. Some of these polyorganosiloxanes are of the type prepared by the reaction of acrylic add or methacrylic acid with polydimethylsiloxane containing hydroxyl groups or epoxy groups.

The radiation-curable release compositions that are useful with the present subject matter optionally may contain at least one photoinitiator. The amount of photoinitiator included in the release compositions may range from about 0% to about 10%, more often from about 0.5% to about 5% based on the total weight of the radiation-curable composition. A photoinitiator is incorporated into the curable release compositions when compositions are to be cured by exposure to non-ionizing radiation such as ultraviolet light. Photoinitiators are not required when the curable silicone is cured by, electron beam radiation. Examples of photoinitiators which may be used in combination with ultraviolet light includes, for example, benzyl ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone; benzoquinone; 1-chloroanthroquinone; p-diacetyl-benzene; 9,10-dibromoanthracene; 1,3-diphenyl-2-propanone; 1,4-naphthyl-phenyl ketone; 2,3-pentenedione; propiophenone; chlorothioxanthone; xanthone; and mixtures thereof.

The silicone release compositions that are useful can be in the form of solutions in organic solvents or emulsions in water, or they can be in neat form (solventless) when the silicone composition is a liquid. These release compositions are electrostatically sprayed on to a substrate which overlies a grounded support structure until a coat weight is achieved that is generally in the range of about 0.1 to about 1000 gsm, and in one embodiment about 0.1 to about 500 gsm, and in one embodiment about 0.1 to about 250 gsm, and in one embodiment about 0.1 to about 100 gsm, and in one embodiment about 0.2 to about 50 gsm. In one embodiment, the coat weight is in the range of about 0.2 to about 14 gsm. In one embodiment, the coat weight is in the range of about 0.9 to about 1.5 gsm. In one embodiment, the coat weight is in the range of about 0.8 to about 28 gsm. In one embodiment, the thickness or caliper of the resulting release-coated substrate may range from about 4 to about 10 mils, and in one embodiment about 4 or 4.5 to about 6 mils.

In one embodiment, two or more release coating layers are sprayed, one on top of another. In this embodiment, it is convenient to use a separate spray head for each release coating material being sprayed.

The carrier can include one or more paper substrates, one or more polymeric film substrates, and/or combinations thereof. Paper substrates are particularly useful because of the wide variety of applications in which they can be employed. Paper is also relatively inexpensive and has desirable properties such as antiblocking, antistatic, dimensional stability, and can potentially be recycled. Any type of paper having sufficient tensile strength to be handled in conventional paper coating and treating apparatus can be employed as the substrate. Thus, any type of paper can be used depending upon the end use and particular personal preferences. Included among the types of paper which can be used are clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 30 to about 120 pounds per ream are useful, and in one embodiment about 60 to about 100 pounds per ream are useful. The term "ream" as used herein equals 3000 square feet. Examples of specific papers that can be used include 41-pound offset grade bleached Kraft; 78-pound bleached Kraft paper, etc.

Alternatively, the substrate may be a polymer film, and examples of polymer films include polyolefin, polyester, polyvinyl chloride, polyvinyl fluoride (PVF), polyvinylidene difluoride (PVDF), etc., and combinations thereof. The polyolefin films may comprise polymer and copolymers of monoolefins having from 2 to about 12 carbon atoms, and in one embodiment from 2 to about 8 carbon atoms, and in one embodiment 2 to about 4 carbon atoms per molecule. Examples of such homopolymers include polyethylene, polypropylene, poly-1-butene, etc. The examples of copolymers within the above definition include copolymers of ethylene with from about 1% to about 10% by weight of propylene, copolymers of propylene with about 1% to about 10% by weight of ethylene or 1-butene, etc. Films prepared from blends of copolymers or blends of copolymers with homopolymers also are useful. The polymer films may be extruded in mono or multilayers.

Another type of material which can be used as the substrate is a polycoated kraft liner which is basically comprised of a kraft liner that is coated on either one or both sides with a polymer coating. The polymer coating, which can be comprised of high, medium, or low density polyethylene, propylene, polyester, and other similar polymer films, is coated onto the substrate surface to add strength and/or dimensional stability to the substrate. The weights of these substrates typically range from about 30 to about 100 pounds per ream, and in one embodiment about 40 to about 94 pounds per ream. In total, the final substrate is typically comprised of between about 10% and about 40% polymer and from about 60% to about 90% paper. For two sided coatings, the quantity of polymer is approximately evenly divided between the top and bottom surface of the paper.

It will be understood that the tapes of the present subject matter can utilize other release agents instead of silicone agents. A wide array of controlled release agents (CRAs) are known in the art and are commercially available.

In certain embodiments, silicone release agents and potentially any release agent, can be eliminated if certain materials are used for the liner and/or carrier. For example, a low surface energy material such as a polyethylene film can in certain instances be used alongside certain adhesives without the need for a release agent layer therebetween. High density polyethylene and low density polyethylene are representative examples of potentially suitable low surface energy materials. Homogenous and heterogeneous polymeric mixtures can be used for the low surface energy material. Thus, in these embodiments, instead of utilizing a double release coated carrier having two oppositely disposed release layers, a single carrier layer of a low surface energy material can be utilized. The low surface energy carrier provides oppositely directed release faces.

Double Release Coated Liner or Low Surface Energy Liner

The double coated liner, i.e., liner 10, can in certain embodiments include first and second release layers 12 and 16, respectively, and a liner 14. Each of these are as follows.

In many embodiments, the release layers include silicone release coating compositions. Details of silicone release coating compositions are provided in the previous description of the double release coated carrier.

The liner can include one or more paper substrates, one or more polymeric film substrates, and/or combinations thereof. Details of these materials and constructions are as previously provided in association with the double coated carrier.

As previously noted, in certain embodiments, instead of utilizing a double release coated liner having two oppositely disposed release layers, a single liner layer of a low surface energy material can be used. The low surface energy liner provides oppositely directed release faces.

Differential Release System

In particular embodiments, the present subject matter tapes include a differential release system. The term "differential release system" as used herein refers to utilizing a particular arrangement of release layers in a tape assembly such that the release layers exhibit particular release levels relative to the other release layers in the tape. For example, in the tape 100, a total of four release layers are included, i.e., release layer 12, release layer 16, release layer 32, and release layer 36. The release level or tack level of each layer is less than an adjacent level when comparing release layers from the face 11 to the face 43. Thus, the release level of release layer 12 is less than the release level of release layer 16. The release level of release layer 16 is less than the release level of release layer 32. The release level of release layer 32 is less than the release level of release layer 36. Although tapes featuring such differential release systems are convenient to use as explained in greater detail herein, it will be understood that the present subject matter includes tapes that do not utilize or include a differential release system. Thus, a release level of one face can be greater than, less than, or equal to that of another face of a layered array of the present subject matter.

A variety of agents and additives can be added or incorporated in any of the layers or components of the tapes. For example, antimicrobial and/or antimold agents can be included in either or both of the adhesive layers. Coloring agents can be included. Topcoats and/or adhesion promoters or blockers can be provided on the carrier and/or the liner.

The tapes of the present subject matter have a typical thickness of from about 1 mil to about 20 mils, and in many embodiments from 3 mils to 15 mils. However, it will be understood that the present subject matter tapes can have a total thickness less than 3 mils or greater than 20 mils.

Methods

The present subject matter also provides various methods associated with the tape assemblies described herein. In one embodiment, a method of applying a tape to an insulation jacket or section of insulation jacketing is provided. Referring to FIG. 14, the adhesive face 43 of the primary adhesive 40 is adhered to a surface of insulation jacketing 50, and typically to extension or flap of the outer layer 56. Since in many embodiments the adhesive 40 is a pressure sensitive adhesive, the tape 100 is adhered to the jacket by merely contacting the mating surfaces or faces together. However, it will be appreciated that the present subject matter includes the use of additional operations such as application of heat and pressure to promote and/or facilitate attaching the tape 100 to the jacket 50. In many uses of the tapes, a manufacturer or supplier of insulation jacketing applies the tape to section(s) of jacketing for subsequent use in the field, for example.

Figure 15:
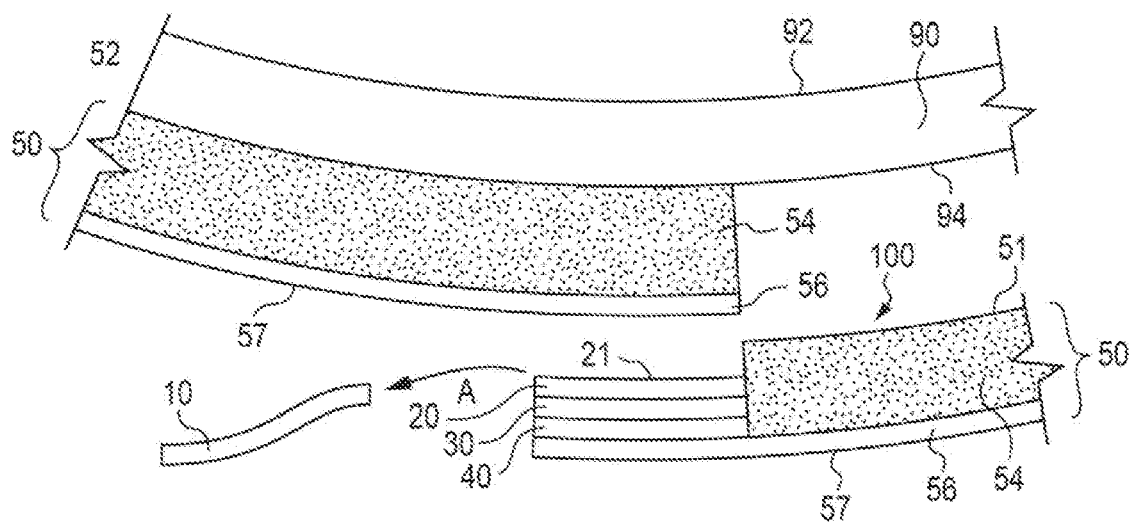
FIGS. 15 to 19 are schematic cross sectional views depicting use of the tape of FIG. 1 to seal the insulation jacketing around a pipe.

FIGS. 15-19 schematically illustrate sealing insulation jacketing about a pipe using the tape adhered to the jacket to form an insulated pipe assembly 200. Generally, one or more insulation jackets are secured about an object such as a pipe by positioning and enclosing the jacket about the object. At least a portion of the tape assembly adhered to the flap for example, is contacted and eventually adhered to another region of the jacket. Specifically, a section of insulation jacketing 50 is positioned about an outer surface 94 of a pipe 90. In many applications, it is beneficial to have previously attached the tape to the insulation jacketing 50 as shown in FIG. 2. It will be seen that the outer surface 94 of the pipe 90 is generally oppositely directed from an inner surface 92 of the pipe 90. The insulation jacket 50 is positioned about the pipe 90 such that the tape 100 adhered thereto, is disposed between ends of the jacket 50 as depicted in FIG. 15. Upon appropriate positioning, the double coated release liner or low surface energy liner 10 of the tape 100 is then removed as shown by arrow A in FIG. 15 to thereby expose the secondary adhesive 20. Specifically, upon removal of the liner 10, an adhesive face 21 of the adhesive 20 is exposed.

If the tape 100 includes a differential release system, the release liner 10 can be readily removed from the adhesive layer 20 because the release level of release layer 16 is less than the release levels of release layers 32 and 36. Thus, the liner 10 can be readily removed without separating or disrupting any of the other layers of the tape 100.

Figure 16:
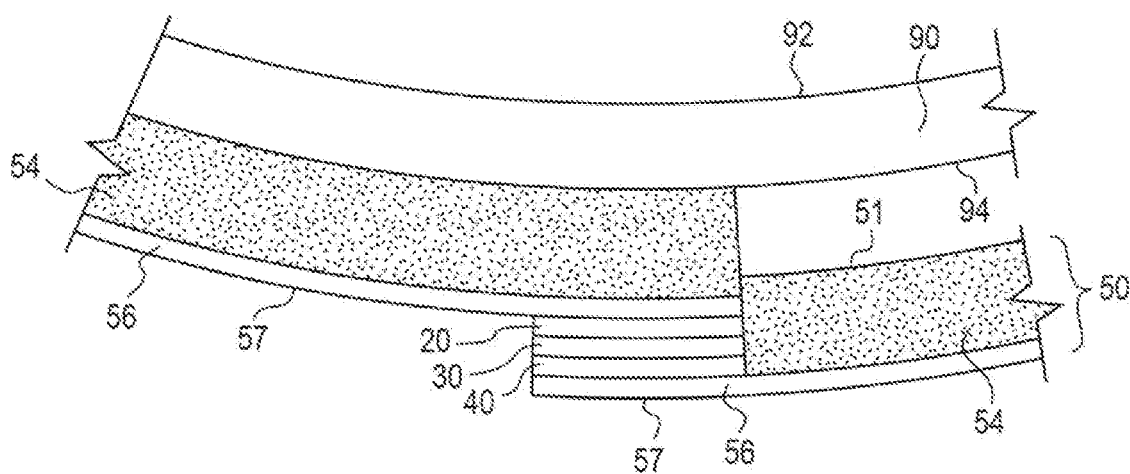
Figure 17:
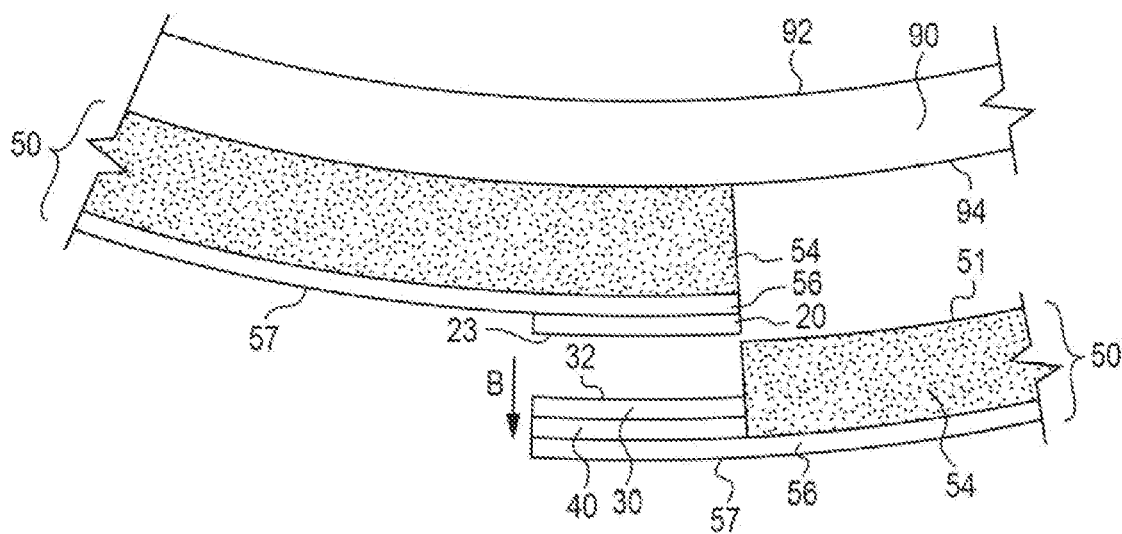

The adhesive face 21 of the adhesive 20 is then adhered to the outer face 57 of the jacketing 50. As previously noted, the adhesive 20 is a pressure sensitive adhesive and thus such adherence is achieved by mere contacting of the mating surfaces. After the noted adherence, the assembly is as shown in FIG. 16.

Next, the two end portions of the jacketing 50 are separated from one another. This is typically performed by moving or otherwise displacing the outermost end portion of jacketing 50 in the direction of arrow B shown in FIG. 17. As a result of the previously noted differential release system of the tape, the adhesive 20 remains adhered to the outer face 57 of the jacketing 50 and the adhesive 20 separates from the first release layer 32 of the double coated release carrier or low surface energy carrier 30. An adhesive face 23 of the adhesive 20 then becomes exposed.

Figure 18:
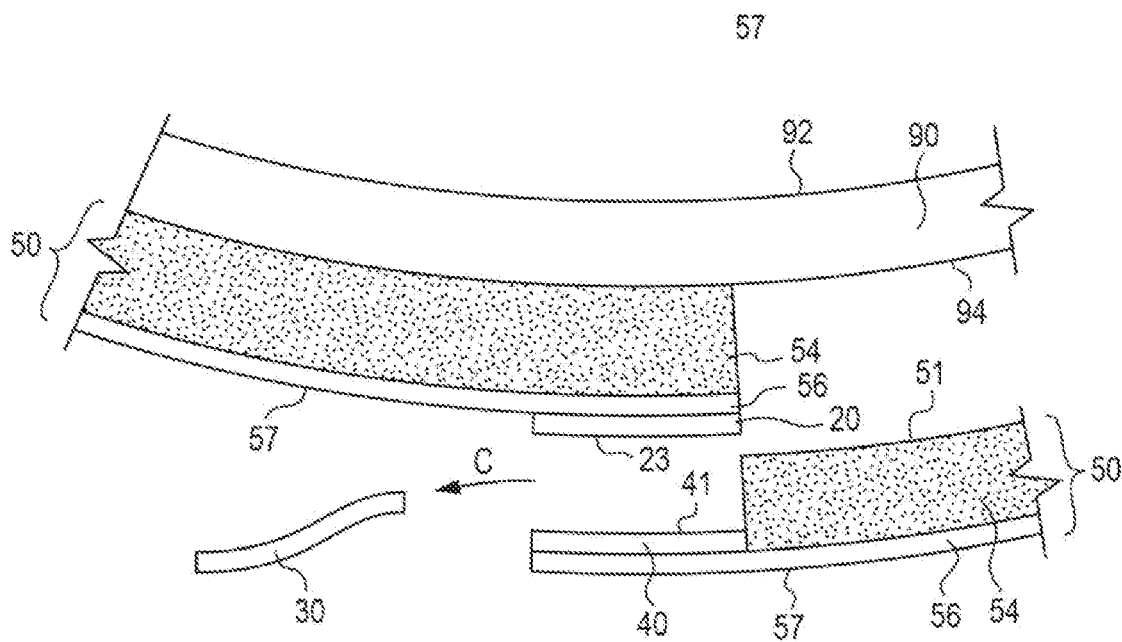

Referring to FIG. 18, after such separation, the double coated release carrier 30 or low surface energy carrier is removed as shown by arrow C. Upon such removal, the adhesive face 41 of the primary adhesive 40 is exposed.

Figure 19:
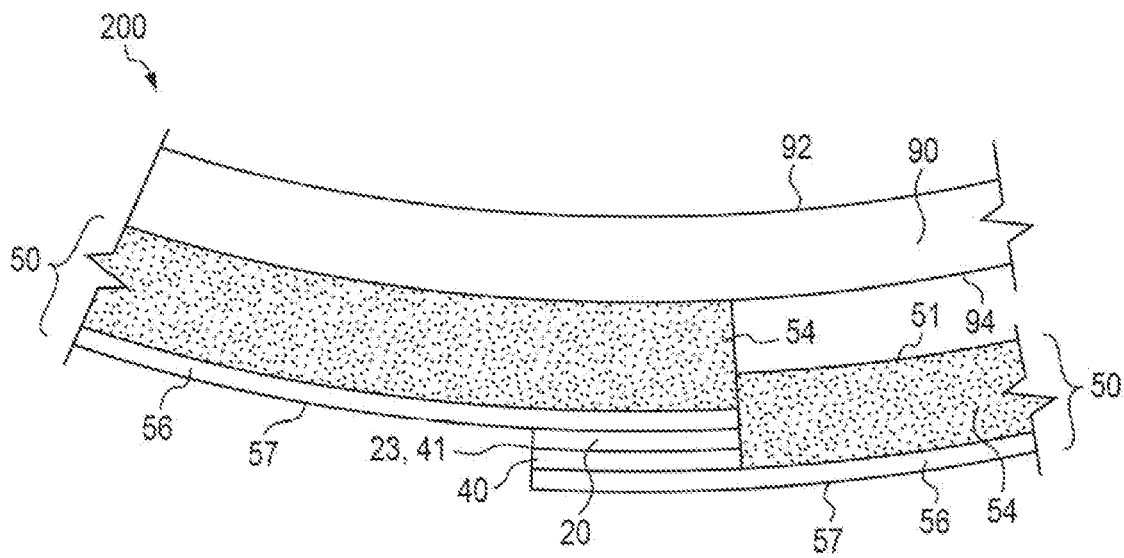

The insulation jacketing 50 is then sealed and/or secured about the pipe 90 by adhering the primary and secondary adhesives 20 and 40 together as shown in FIG. 19. Typically, this is performed by contacting the adhesive faces 23 and 41 together. This results in a strong and weather-tight seal.

The actual thickness of the tape layers 20, 30 and 40 is exaggerated in the drawings in order to show the construction of the tape. Although FIGS. 16 and 19 show a significant gap between the pipe 90 and the inner face 51 of the insulation, the actual gap can be minimal to non-existent upon application.

Figure 20:
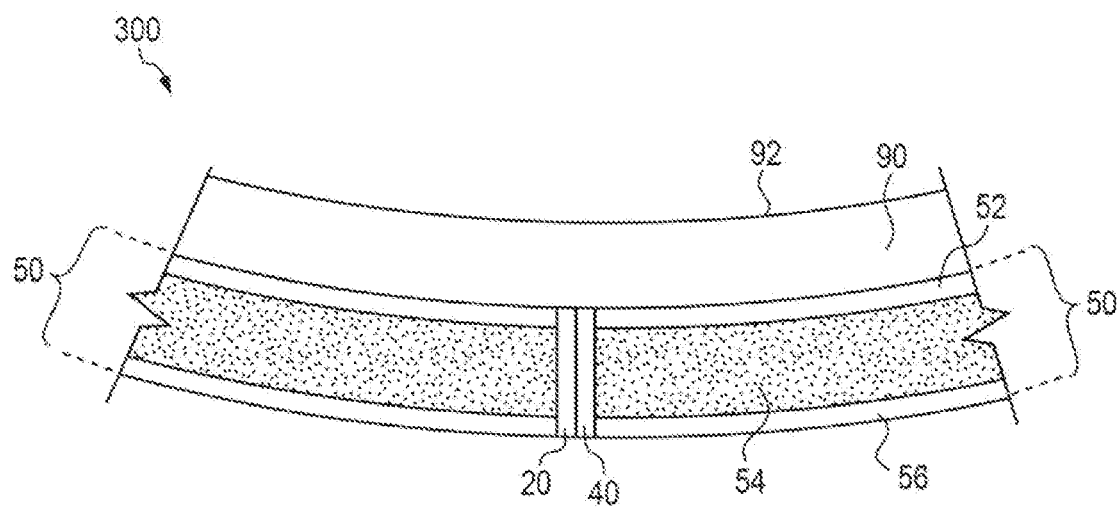
FIG. 20 is a schematic cross sectional view illustrating another use of the tape to seal insulation jacketing around a pipe.

FIG. 20 schematically depicts another insulated pipe assembly 300 in accordance with the present subject matter. In this assembly, a section of tape as described herein is utilized between adjacent abutting end sections of insulation jacketing 50. The liner and carrier are removed during the sealing process as previously described to produce the configuration shown in FIG. 20.

The present subject matter tapes, insulation segments or jackets, and methods can be used to secure insulation about a wide array of objects. For example, the objects to be insulated can include pipes, tubes, conduits, ducts, fluid transport members, air or gas transport members, hoses, mains, lines, channels, drains, and siphons. Although applications involving industrial piping are contemplated other uses may exist such as for example vehicles, appliances, aerospace, marine, and residential.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A method of forming a securable insulation jacket, the method comprising:
providing an insulation jacket defining an inner face, an outer face, a first end, a second opposite end, and a flap extending between the first end and the second end;
providing a tape assembly including (i) a carrier having a first release face and a second release face, (ii) a primary adhesive disposed along the second release face of the carrier, (iii) a secondary adhesive disposed along the first release face of the carrier, and (iv) a liner having a first release face and a second release face, the liner disposed along the secondary adhesive;
adhering the primary adhesive of the tape assembly to the flap of the insulation jacket to thereby attach the tape assembly to the insulation jacket, and form the securable insulation jacket;
wherein both the primary adhesive and the secondary adhesive are pattern coated on the respective second and first faces of the carrier, and the respective second and first faces of the carrier are 2% to 20% free of adhesive; and
wherein a release level of the first release face of the liner is less than a release level of the second release face of the liner;
wherein the release level of the second release face of the liner is less than a release level of the first release face of the carrier; and
wherein the release level of the first release face of the carrier is less than a release level of the second release face of the carrier.

2. The method of claim 1 wherein the adhering is performed by adhering the primary adhesive of the tape assembly to the inner face of the insulation jacket along the flap of the insulation jacket.

3. The method of claim 1 wherein the insulation jacket includes an insulating layer having a material selected from the group consisting of fiberglass, mineral wool, foamed cellular fiberglass, and rigid foam.

4. The method of claim 1 wherein the insulation jacket includes at least one layer of a material selected from the group consisting of paper, scrim, metal foil, and combinations thereof.

5. The method of claim 1 wherein the carrier is a polymeric film.

6. The method of claim 1 wherein the carrier is paper.

7. The method of claim 1 wherein the first release face and the second release face of the carrier include at least one siliconized release agent.

8. The method of claim 1 wherein the liner is a polymeric film.

9. The method of claim 1 wherein the liner is paper.

10. The method of claim 1 wherein the first release face and the second release face of the liner include at least one siliconized release agent.

11. The method of claim 1 wherein the primary adhesive is selected from the group consisting of acrylic adhesives, rubber adhesives, and silicon adhesives.

12. The method of claim 1 wherein the secondary adhesive is selected from the group consisting of acrylic adhesives, rubber adhesives, and silicon adhesives.

13. The method of claim 1 wherein both the primary adhesive and the secondary adhesive are acrylic adhesives.

14. The method of claim 1 wherein both the primary adhesive and the secondary adhesive are rubber adhesives.

15. The method of claim 1 wherein both the primary adhesive and the secondary adhesive are silicon adhesives.

16. The method of claim 1 wherein the tape assembly consists of the carrier, the primary adhesive, the secondary adhesive, and the liner.

17. The method of claim 1 wherein the primary adhesive is in the form of a layer having a width that is less than a width of the tape assembly.

18. The method of claim 1 wherein the secondary adhesive is in the form of a layer having a width that is less than a width of the tape assembly.

19. The method of claim 17 wherein the secondary adhesive is in the form of a layer having a width that is less than the width of the primary adhesive.

20. The method of claim 17 wherein the secondary adhesive is in the form of a layer having a width that is greater than the width of the primary adhesive.

21. The method of claim 1 wherein the primary adhesive is in the form of a plurality of lanes spaced apart from one another.

22. The method of claim 1 wherein the secondary adhesive is in the form of a plurality of lanes spaced apart from one another.

* * * * *